United States Patent
Skiba et al.

(10) Patent No.: US 9,542,455 B2
(45) Date of Patent: Jan. 10, 2017

(54) ANTI-TRENDING

(71) Applicant: Avaya, Inc., Basking Ridge, NJ (US)

(72) Inventors: David Skiba, Golden, CO (US);
George Erhart, Loveland, CO (US);
Lee Becker, Boulder, CO (US);
Valentine C. Matula, Granville, OH (US)

(73) Assignee: Avaya Inc., Basking Ridge, NJ (US)

( * ) Notice: Subject to any disclaimer, the term of this patent is extended or adjusted under 35 U.S.C. 154(b) by 223 days.

(21) Appl. No.: 14/103,003

(22) Filed: Dec. 11, 2013

(65) Prior Publication Data

US 2015/0161216 A1    Jun. 11, 2015

(51) Int. Cl.
| G06F 7/02 | (2006.01) |
| G06F 17/30 | (2006.01) |
| H04L 12/58 | (2006.01) |
| G06Q 10/10 | (2012.01) |
| G06Q 50/00 | (2012.01) |

(52) U.S. Cl.
CPC ... *G06F 17/30539* (2013.01); *G06F 17/30598* (2013.01); *G06F 17/30705* (2013.01); *G06F 17/30707* (2013.01); *G06Q 10/10* (2013.01); *H04L 51/04* (2013.01); *H04L 51/32* (2013.01); *G06Q 50/01* (2013.01)

(58) Field of Classification Search
CPC .............. G06F 17/30539; G06F 17/30598; G06F 17/30705; H04L 51/05
See application file for complete search history.

(56) References Cited

U.S. PATENT DOCUMENTS

| 7,765,212 B2* | 7/2010 | Surendran | G06Q 10/107 707/738 |
| 8,577,884 B2* | 11/2013 | Poteet | G06Q 30/02 707/737 |
| 2001/0042087 A1* | 11/2001 | Kephart | G06F 17/30707 715/229 |
| 2003/0195933 A1* | 10/2003 | Curren | G06Q 10/107 709/206 |
| 2006/0069589 A1* | 3/2006 | Nigam | G06Q 30/02 706/55 |
| 2008/0162652 A1* | 7/2008 | True | H04L 63/1408 709/206 |
| 2010/0262599 A1* | 10/2010 | Nitz | G06F 17/3087 707/723 |
| 2012/0084666 A1* | 4/2012 | Hickman | G06Q 30/02 715/751 |

FOREIGN PATENT DOCUMENTS

WO    WO2012157154 A1    11/2012

* cited by examiner

*Primary Examiner* — Bruce Moser
(74) *Attorney, Agent, or Firm* — Sheridan Ross P.C.

(57) ABSTRACT

An automated system for message analysis whereby messages within a given category may be identified and processed as a category connote. While a domain of messages may be monitored and processed in the due course of business, connote message are different. For example, a number of messages may fall into a domain of "poor airline food." Such messages may be processed in the due course of business. However, a message with a different aspect, such as, "I found glass in my food," may be initially identified as begin within the domain of "poor airline food," and processed further to distinguish the message as being a connote with regard to the "poor airline food" category and warranting special handling.

20 Claims, 3 Drawing Sheets

ANTI-TRENDING

FIELD OF THE DISCLOSURE

The present disclosure is generally directed toward communications and more particularly toward analyzing messages.

BACKGROUND

Social media messages may be monitored to determine trends and identify issues that may be arising. A keyword, hash tag, or phrase of interest may be found in messages a number of times and examined over time. In such a manner, the popularity of a particular issue within a community of users may be determined.

Clustering is a method used to group a set of related items where the items in the cluster are more closely related to each other than to items in other clusters. Cluster analysis is typically used in data mining. Comments on social media are expected when an event occurs, and data analysis can be very useful.

A large scale event like a natural disaster typically creates a large and related set of social media comments. A significantly delayed flight may create a similar, but smaller set of comments. Each of these sets of comments represents a cluster. Within sets of comments, or clusters, there is typically an average nominative value and the cluster develops in a certain way. A known cluster or trend gives expected results that are typical and predictable.

SUMMARY

It is with respect to the above issues and other problems that the embodiments presented herein were contemplated.

A message may be a text (e.g., SMS), e-mail, social media post, comment on a prior post, or other text-based message, such as on various social media websites (e.g., Yelp and other review-focused websites; Facebook, Google+, Twitter, and other general social media websites; company owned forums and individuals' websites; comments on YouTube and other media and non-media hosting websites; and other forums operable to receive a message). Messages may also be a transcript of a voice message or the audio portion of a video message. Once a message is determined to fit into a particular category, such as a cluster, it may be processed according to rules for the cluster. However, messages within a cluster or group may have additional information that is not necessarily acted upon within the default processing rules for a cluster.

Companies use many tools and resources to track names, brands, posts, etc. that are relevant to business of that company. Keyword and phrase searches often provide large amounts of data about a company that can be monitored for sentiment and opportunity. However, this type of searching and tracking generally pulls comments and/or posts clusters of comments and/or posts, many of which will be similar.

In certain embodiments herein, a gap is addressed, whereby the prior art systems do not specifically and automatically look for messages within clusters to see if additional message content exists that is significant and actionable beyond the reasons for adding the message to the cluster, and then take specific action to address the message.

For example, an airline may have policies in place to handle more domain-centric messages, "I didn't like the food on my flight," for handling issues in the domain of "food complaints" for the airline. However, a message, such as, "the dinner served on my Friday flight in first class was unbelievably disgusting," is potentially more serious if a verified first class passenger—a more profitable customer—was not happy with their meal. In an effort to keep a more profitable customer happy, the airline may then take special measures as compared to the mainstream complains from mainstream customers which may define the category.

In one embodiment, a three-step process of analysis is provided. The analysis automatically provides a contact center meaningful connotes on which to act. Connotes have a primary meaning within the category or cluster and a secondary meaning outside the category or cluster. The actions taken for connotes address the secondary meaning in addition to, or outside of, the acts taken for the more common messages within the cluster, including taking special steps, expedited processing, and/or verifying the connote with external information. The three steps include dimensionality reduction, subtraction, and figuring intent.

The first part of the process (step 0) is providing a system that has a trending/clustering process. The system is operable to identify the main trends (clusters) and the anti-trends (connotes). The anti-trends/connotes are sent through Steps 1-3.

Step 1: Dimensionality reduction (DR). DR is a process used to reduce the number of variables that may be considered by a system. For example, a system may be operable to look at the top 100 words, which typically vary by domain. If a top word appears in one message and more than once but less than every message, every time, the system would determine based on the appearance if it might be a candidate for analysis. Features and attributes would be analyzed for inclusion or exclusion.

Step 2: Subtraction. The common and expected variables in a cluster are removed. There are a few ways to break it up a priori [A priori knowledge or justification is independent of experience (e.g., "All bachelors are unmarried.")]. Algorithms, hashing, and other known procedures may be used for subtraction.

Step 3: figuring intent. The system, after dimensionality reduction and subtraction, is operable to determine intent. Determination can be made as to whether or not the connotes are both significant and actionable. Does the connote have intent in the company's domain? The message is about what? Should something be done about the message? Is the message public—known or unknown (a company may not care about a message that isn't public or widely seen). Looking at the message in the domain, identifying intent, and finding actionable items are one important aspect. For the actionable message, the system can specifically link into the known user context. A connote that fits all the categories would be actionable, like in the example above, if the food message was from a known top-tier frequent flyer for the airline and was verified on a flight to japan that day.

External information may be used to determine if it's rare or not, determine uniqueness, and may provide hints as to course of action (e.g., there was a massive tornado in the area at the time of the messages). Intrinsic characteristics of a channel might provide additional indicators (e.g., likes, re-Tweets, views, etc.).

In another embodiment, additional actions might be considered or taken, which include initiation of outbound campaigns, special routing, and special escalation procedures and delivery to specially trained agents. Other protocols and combinations of actions as well as degrees of listed actions could also be developed for damage control.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedent.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
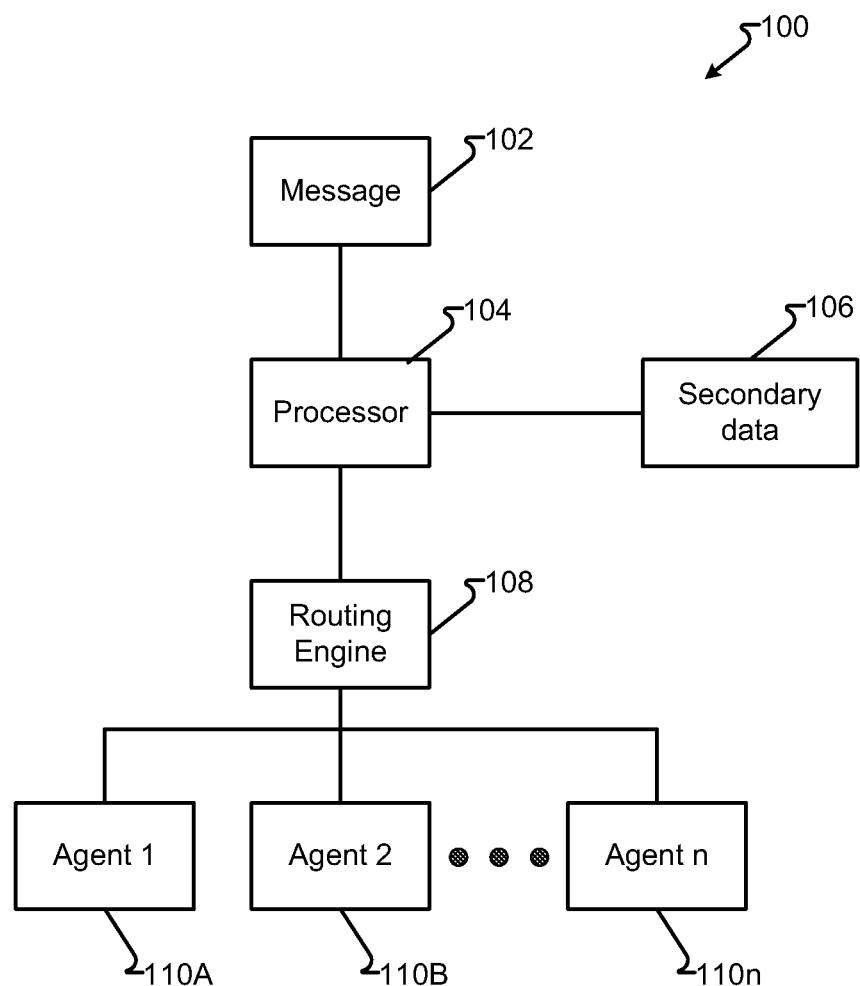
FIG. 1 is a system is disclosed in accordance with embodiments of the present disclosure.

With reference now to FIG. 1, system 100 will be described in accordance with embodiments of the present disclosure. In one embodiment, system 100, or portions thereof, are within a contact center's operational system and/or control. System 100 may include processor 104, operable to access message 102. Message 102 may be received directly (e.g., SMS message, e-mail, etc.) or retrieved from a social media website (e.g., posts), internal website, or other message repository. Optionally, processor 104 may access secondary data 106 to provide additional message attributes associated with message 102. Processor 104 may then analyze message 102 and, if found to be a connote, cause routine engine 108 to route message 102 to one of agents 110A-110n accordingly.

Message 102 may be described by various message elements. Message elements may include, with respect to the message content, individual words, phrases, abbreviations, symbols, etc. Message elements may also be associated with non-message content. Examples of non-message content message elements include metadata (e.g., date sent, originator name, recipient/destination, originator device, etc.). Situational factors, such as environmental conditions, may be identified and selectively excluded, messages from being connotes. In one embodiment, the secondary meaning of a connote is associated with a corresponding secondary factor, a factor that is associated with the more central purpose of category. For example, a flight delay complaint from a frequent flyer may be handled in the normal course of events. However, if the message includes the words, "5 hour delay," the message may be considered a connote and processed as an exceptionally long delay. However, if an environmental factor existed, such a storm in the area, there is little the airline, or a competing airline, could have done and, therefore, the message considered a non-connote.

In one embodiment, secondary data 106 is accessed to retrieve certain non-message content message elements. Secondary data 106 may have message attributes associated with the originator, including, the relationship with the originator and the organization (e.g., frequent flier, platinum-level member, etc.), geographic location, demographic information, etc. Secondary data 106 may also provide context message elements, for example, the presence of a disaster condition within the vicinity of the originator at the time message 102 was sent.

Messages may be first placed in a number of categories. The placement of specific messages into a specific category is a matter of design choice. In one example, an airline looks for "food" messages and any message with the word, "food," or an equivalent (e.g., meal, lunch, dinner, meat, beef, chicken, pasta, etc.) is placed within the category. All other messages are discarded or processed as non-food messages. In another example, the messages are run through an analysis whereby the category is, at least in part, a self-determined number of clusters. Clustering techniques are generally known in the art of categorizing large volumes of data. The number of messages may be determined, at least in part, by the depth of the messages. If more clusters are permitted, the variation within the clusters becomes more narrow, same with the converse. For example, if a large pool of message discuss food, the clusters may form with clusters having very detailed aspects of the food-related messages. In another example, if a large pool of messages discuss all aspects of air travel, then the food clusters will be fewer and more broad with other clusters containing other aspects of air travel.

While a large number of clusters or categories may provide for a more accurate placement within each cluster or category, the result may be undesirable when the number of clusters is larger than the number of actual topics. In this case, multiple clusters will contain items that are overlapping topics that should have been clustered together.

In one embodiment, message 102 and/or message attributes are analyzed by processor 104 to determine if it is within a target category, and/or if it is a connote of that category. Message 102, if determine to be a mainstream message, that is not a connote, for a domain and/or category may be processed according to the domain/category processing rules. Message 102, if determined to be a connote, may then be processed as a connote. In one embodiment, routing engine 108 selects one of agents 110 to process message 102 as a connote and may be provided with message 102 and optionally an indication as to why processor 104 determined the message to be a connote.

It should be noted that the division between a domain and a category may be arbitrary and/or subject to business and/or industry norms. For example, one airline may consider a domain to be "XYZ airline complains" and categories to be, "food," "customer service," "flight operations," etc. Whereas another airline may consider a domain to be "ABC Airlines food," "ABC Airlines gate personnel," "ABC Airlines cabin personnel," etc. and categories to be more specific elements, such as, "poor food choices," "wrong temperature," "taste issues," etc. As used herein, categories are generally considered as subunits of domains although, as described above, what constitutes a domain or a category is a matter of design choice.

Figure 2:
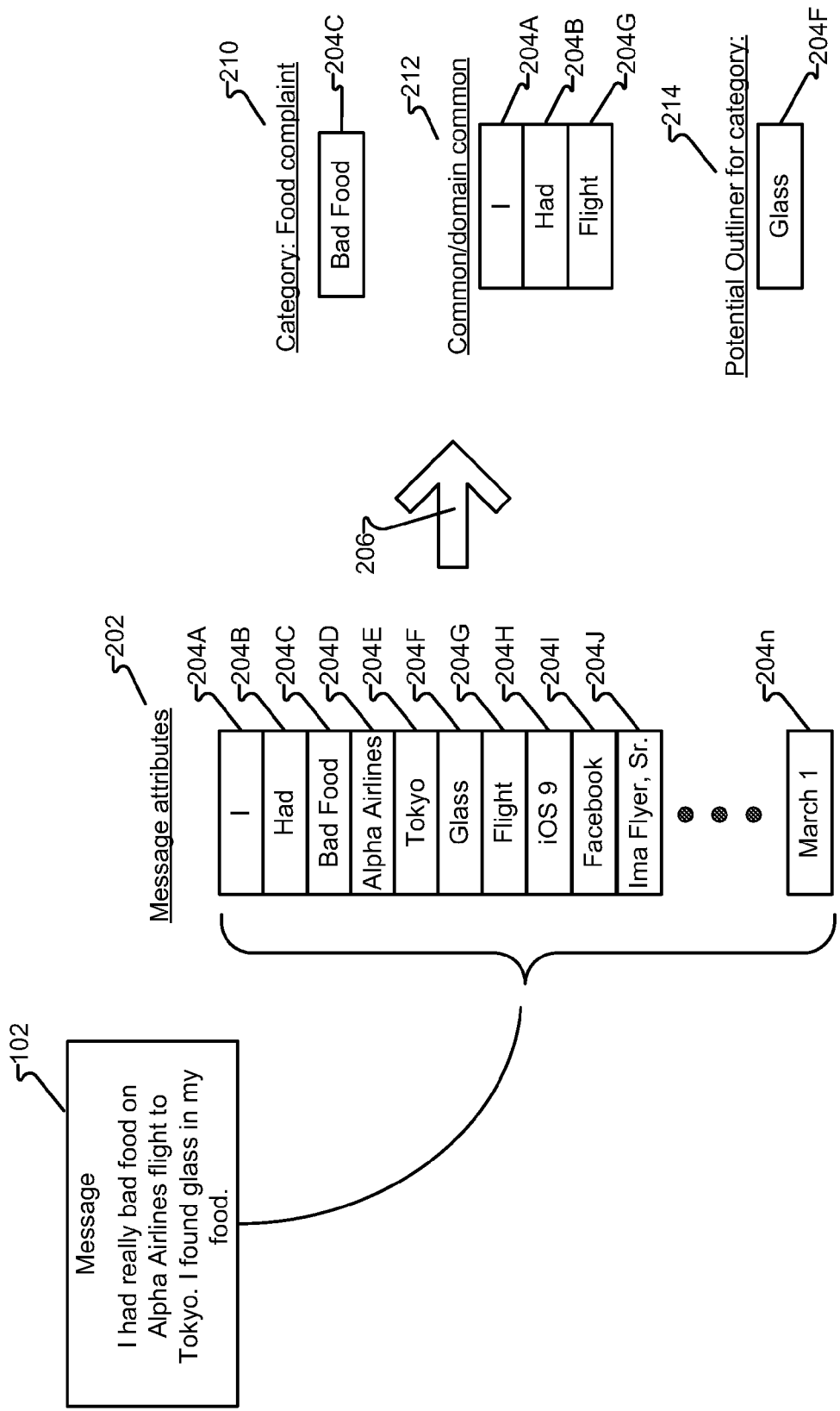
FIG. 2 is a message disclosed in accordance with embodiments of the present disclosure.

With reference now to FIG. 2, an illustrative message 102 will be disclosed in accordance with embodiments of the present disclosure. In one embodiment, message 102 contains a number of message attributes 202. Message attributes 202 may be more or fewer of the total message attributes 202 that may be present and/or used for a particular message 102. Similarly, certain ones of message attributes 202 may also be omitted as a matter of design choice.

Message attributes 202 includes a number of single word content message attributes 204A, 204B, 204E, 204F, 204G; multi-word content message attributes, 204C, 204D; and metadata, such as, creator message attribute 204J; message destination/location message attribute 204I; operating system message attribute 204H; date of message attribute 204n; and optionally other message attributes 202 (not shown).

Message attributes 202 are initially processed 206, such as by processor 104 to determine category 210. Message attributes 202 that are determinate of category 210, such as message attribute 204C, are then omitted from further processing. Common words (e.g., "the," "and," "to," "a," etc.) and/or common domain words 212 (e.g., "flight," "fly," "trip", "lunch," "dinner," etc. for the domain of air travel), such as message attributes 204A, 204B, 204G are identified and omitted from further processing.

As a matter of design choice, other message attributes may be selectively included or excluded from further processing. For example, creator message attribute 204J, may be always, never, or selectively considered. If an entity processes rules the same way, regardless of who the creator is or is not, then creator message attribute 204J may be omitted as an indeterminate. However, if an entity processes messages in a manner that is dependent on the message creator's identity, message attribute 204J may always be considered. As a further example, if creator message attribute 204J may, based on other factors, be determinate and therefore selectively included or omitted. For example, if creator message attribute 204J is compared to a secondary data 106, which is a passenger manifest database, and such a comparison reveals a secondary attribute, such as, the message creator was verified as being on a flight in question, then message creator attribute 204J may be included.

As a further embodiment, message 102, after determining category 210; removing category message attribute 204C; removing common word message attributes 204A, 204B, 204G; and removing other message attributes 202 determined to be non-indicative of a connote. If no message attributes 202 remain, or if those message attributes 202 are determined to be non-actionable, message 102 to be processed in a normal manner. Normal processing may be normal for all messages or normal for messages with category 210. However, if message 102 has message attributes 202 that remain, message 102 may be a connote.

Continuing the example, message attribute 204F remains. Message attribute 204F is not a message attribute normally encountered as a category determinate message attribute 204C; common word message attribute 204A, 204B, 204G; or other message attribute 202 typically expected for such category 210. Therefore, message 102 may be identified as a connote and processed outside of the normal processing rules, such as routing to an agent operable to process connote messages or routing message 102 out-of-turn to expedite processing.

In one embodiment, an unusual word, such as message attribute 204, is determined by a trend window on relative frequency ratio ("RFR") of words in the window. First, a general word frequency of occurrence is generated off of a large collection of historic documents (e.g., social media items, SMS, e-mail, etc.) for the business to compute the average rate of occurrence per million words. If the word collection is 1,000,000 words and the word, "glass" occurs 2 times, giving it the statistical probability of 2/1000000=0.000002.

Within each trend window (e.g., an hour, a day, a week, etc.), the word occurrence statistics are generated over the words in the window. If 200,000 words occur in this window and 2 of them are the word "glass", giving the statistical probability of 2/200000=0.00001.

Then, the RFR for "glass" in the trend window is computed as the probability of "glass" in the trend window divided by the probability of "glass" in the historic sample: 0.00001/0.000002=5, where 5 means that "glass" occurs 5 times more often than average in the trend window.

An RFR score >1 means the word appears more frequently in the trend window than normal (historic rate of occurrence); an RFR=1 means the occurrence is the same rate as the normal; and RFR <1 means the word occurs less frequently than normal.

In another embodiment, certain message attributes 202 may be processed to determine abnormal values and kept or removed accordingly. For example, message attribute 204H represents the operating system associated with the device used to create message 102. The value may be an expected value and, absent other information, indicate message 102 is not a connote and allow message 102 to be processed as a normal message, or at least as a normal message within category 210. However, message attribute 204H, if it were to be an unusual value, such as a very old operating system, a little used operating system, or an unknown operating system, message 102 may be determined to be a connote.

An agent may then be presented with message 102 which may further query the agent to resolve the issue of the operating system. For example, "When complete, was there anything unusual noticed when processing this message?" Or, something more specific, such as, "This message was created on a device using the XYZ operating system. Did you notice anything unusual and, if so, what?" In a further example, a number of messages having an unusual operating system, as determined by message attribute 204H, may be discovered to be untraceable to a human creator. Therefore, an entity may conclude that at least one such message was a created by a robotic or automated process (e.g., spambot) and determine the message is a connote for such a reason. Furthermore, future messages with the same operating system may be determined to also be from a robot and discarded as not meaningful and/or not actionable.

In another embodiment, message 102 may contain message attributes 202 which are connotes in one context but not a connote in another context. For example, message 102 comprises a text portion of, "Horrible flight delays today on Alpha Airlines." If Alpha Airlines is exceptionally prompt, it may not encounter the message attribute 202 with the term, "horrible," within category 210 associated with "flight delays." Accordingly, such a message may be a connote. However, if at least one message attribute 202 indicates the creator was in the vicinity of a major storm, such as by accessing secondary data 106, the message may be determined to be associated with a secondary message attribute of bad weather and, therefore, message 102 is a normal, or non-connote, delay-based complaint based on the weather. In one embodiment, the combination of words (e.g., bigrams/trigrams/etc.) may be determined in a manner similar to that of individual words utilizing the RFR technique described above with respect to individual words.

Figure 3:
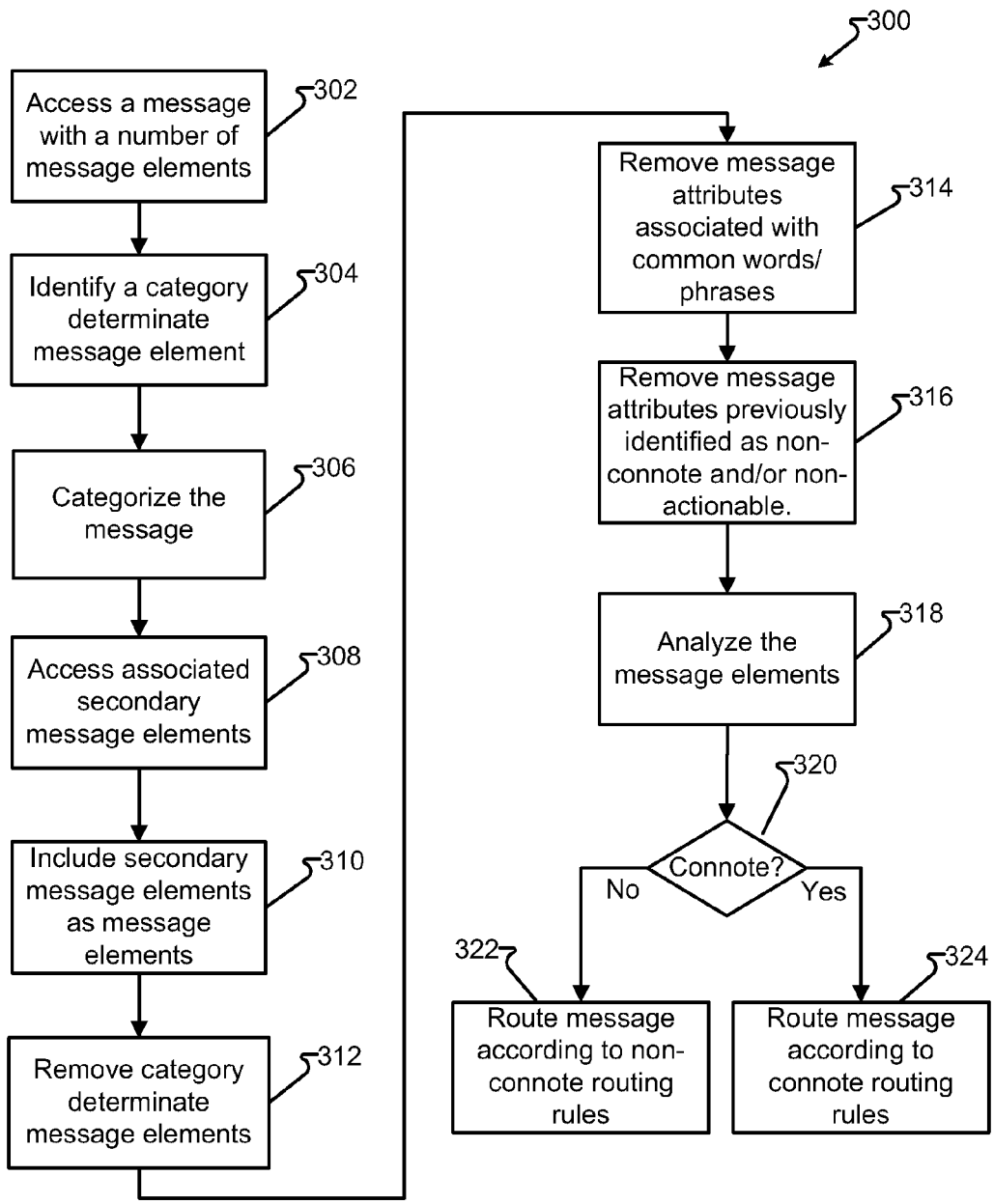
FIG. 3 is a flowchart disclosed in accordance with embodiments of the present disclosure.

With reference now to FIG. 3, flowchart 300 will be disclosed in accordance with embodiments of the present disclosure. In one embodiment, step 302 accesses a number of message elements, such as by processor 104 accessing message 102 and associated message elements 202. Step 304 identifies a category determinate message element or number of message elements. If step 304 cannot determine a category, flowchart 300 may proceed directly to step 322 or 324 as a matter of design choice. Step 306 then categorizes the message.

Optionally, steps 308 and 310 may be performed. Step 308 accesses secondary message elements, such as from secondary data 106, and includes the secondary message elements as message elements in step 310. For example, the message attribute associated with the creator of the message may indicate the creator is a member of an affinity program with the business, the message was sent from an area experiencing a disaster or state of emergency, or the number endorsements are unusual. An endorsement may comprise a sharing, re-post, like, or other acknowledgement of a message by a viewer of the message on a social media website. A message, in this example a social media post, may have content that appears to be ordinary or otherwise not a connote. However, if the number of endorsements is unusually high for such a message, the message may be considered a connote. The processing of such a connote message may reveal the message creator is a celebrity, the threshold value for the number of endorsements needs adjustment, or other factor outside the norm.

Step 312 removes the category determinate message elements, determined in step 304, from further processing. Step 314 removes messages attributes with common words and/or phrases which are not indicative of a connote. Step 316 removes message attributes that are previously determined to be non-connotes and/or non-actionable. For example, as language changes, especially with regard to slang, shorthand, idiomatic expressions, a message attribute in the form of a word or phrase may be encountered that is initially processed as a connote. Such terms may then be used to determine non-connotes for other messages. For example, the message, "When can I buy a ticket to Mars," when first encountered, is determined to be actionable and processed accordingly. The result of the process may be to determine the message is not actionable. When subsequently encountered, the associated message elements (e.g., "ticket to Mars") may be determined to be non-actionable and processed in the normal course of business, which may include ignoring the message. In another example, the message, "I hated my flight. Sat next to a chatterbox," may be associated with a category, such as "dissatisfied with flight," but the message attribute, "chatterbox" may be determined to be non-actionable—assuming the airline is not planning on changing flights or seating arrangements for those passengers deemed to be a "chatterbox." However, such non-actionable message attributes may be non-actionable, but only with respect to a particular category. For example, another message: "Flight attendant was a chatterbox on the redeye. Couldn't sleep," may be actionable if it is within a category of "Cabin crew complaints." Step 320 directs the message according to whether or not it was determined to be a connote from the analysis in step 318. If the message is a connote, step 324 routes the message accordingly. If not, step 322 routes the message according to non-connote rules.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
accessing, by a processor, a message having a number of message elements;
identifying, by the processor, a category determinate message element, for a category, from the message elements;
categorizing, by the processor, the message in accord with the category determinate message element;
excluding, by the processor, the category determinate message element from the message elements;
after the category determinate message element has been excluded, analyzing, by the processor, at least one remaining message element to determine whether the message is a connote having a primary meaning within the category and a secondary meaning outside of the category; and
routing the message, by the processor, to a first agent selected according to connote routing rules, upon determining the message is a connote, and routing the message to a second agent selected according to non-connote routing rules different from the connote routing rules, upon determining the message is not a connote.

2. The method of claim 1, wherein at least one of the message elements is a message metadata.

3. The method of claim 1, further comprising, excluding, by the processor, a message element which is a frequently occurring word within a language of the message, from the message elements, prior to analyzing the at least one remaining message element.

4. The method of claim 1, further comprising, excluding, by the processor, frequently occurring words associated with the category, from the message elements, prior to analyzing the at least one remaining message element.

5. The method of claim 1, further comprising, excluding, by the processor, a message element which is a previously identified non-actionable message element for the category, from the message elements, prior to analyzing the at least one remaining message element.

6. The method of claim 1, wherein the message is a text-based message.

7. The method of claim 1, wherein the message is a posting on a social media website.

8. The method of claim 7, wherein at least one of the message elements is a number of endorsements of the message.

9. A system, comprising:
a processor;
a message repository; and
a communication interface; and
wherein the processor:
accesses a message in the message repository having a number of message elements;
identifies a category determinate message element for a category from the message elements;
categorizes the message in accord with the category determinate message element;
excludes the category determinate message element from the message elements;
after the category determinate message element has been excluded, analyzes at least one remaining message element to determine whether the message is a connote having a primary meaning within the category and a secondary meaning outside of the category; and
routing the message, by the processor via the communication interface, to a first agent selected according to connote routing rules, upon determining the message is a connote, and routing the message to a second agent selected according to non-connote routing rules different from the connote routing rules, upon determining the message is not a connote.

10. The system of claim 9, wherein the processor is further configured to access, via the communications interface, a secondary data repository and a number of secondary message elements therein and insert the secondary message elements into the set of message elements prior to the processor analyzing the at least one remaining message element.

11. The system of claim 10, wherein at least one of the number of secondary message elements is a message metadata.

12. The system of claim 9, wherein the processor further excludes a message element which is a frequently occurring word within a language of the message, from the message elements, prior to analyzing the at least one remaining message element.

13. The system claim 9, wherein the processor further excludes frequently occurring words associated with the category, from the message elements, prior to analyzing the at least one remaining message element.

14. The system of claim 9, wherein the processor further excludes a message element which is a previously identified non-actionable message element for the category, from the message elements, prior to analyzing the at least one remaining message element.

15. A system comprising:
means to access, by a processor, a message having a number of message elements;
means to identify a category determinate message element, for a category, from the message elements;
means to categorize the message in accord with the category determinate message element;
means to exclude the category determinate message element from the message elements;
means to analyze, after the category determinate message element has been excluded, at least one remaining message element to determine whether the message is a connote having a primary meaning within the category and a secondary meaning outside of the category; and
means to route the message to a first agent selected according to connote routing rules, upon determining the message is a connote, and routing the message to a second agent selected according to non-connote routing rules different from the connote routing rules, upon determining the message is not a connote.

16. The system of claim 15, wherein at least one of the message elements is a message metadata.

17. The system of claim 15, wherein at least one of the message elements is a number of viewers of the message.

18. The system of claim 15, further comprising, means to determine, by the processor, an environmental context of the message and means to exclude at least one of the message elements associated with the environmental context prior to analyzing the at least one remaining message element.

19. The system of claim 15, further comprising, means to exclude, by the processor, a message element which is a frequently occurring word within a language of the message prior to analyzing the at least one remaining message element.

20. The system of claim 15, further comprising, means to exclude, by the processor, frequently occurring words associated with the category prior to analyzing the at least one remaining message element.

* * * * *